United States Patent
Rashba

(10) Patent No.: US 10,721,526 B2
(45) Date of Patent: Jul. 21, 2020

(54) ENHANCEMENT OF MAIN ITEMS VIDEO DATA WITH SUPPLEMENTAL AUDIO OR VIDEO

(75) Inventor: Marc Rashba, Oak Park, CA (US)

(73) Assignees: SONY CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 1188 days.

(21) Appl. No.: 12/784,942

(22) Filed: May 21, 2010

(65) Prior Publication Data

US 2011/0142416 A1 Jun. 16, 2011

Related U.S. Application Data

(60) Provisional application No. 61/286,506, filed on Dec. 15, 2009.

(51) Int. Cl.
| | |
|---|---|
| H04N 21/443 | (2011.01) |
| H04N 21/431 | (2011.01) |
| H04N 21/462 | (2011.01) |
| H04N 21/472 | (2011.01) |
| H04N 21/4722 | (2011.01) |

(52) U.S. Cl.
CPC ..... *H04N 21/4438* (2013.01); *H04N 21/4312* (2013.01); *H04N 21/4622* (2013.01); *H04N 21/4722* (2013.01)

(58) Field of Classification Search
CPC .......... H04N 21/4312; H04N 21/4438; H04N 21/4622; H04N 21/4722; H04N 21/23; H04N 21/235; G07F 17/3211; G06F 17/211

USPC .......... 386/248, E5.003; 348/473, 553, 564; 705/14.26, 14.27, 26.1; 368/10, 47, 82; 700/16; 715/781, 719, 203; 725/51, 61, 725/112, 114, 146; 463/31

See application file for complete search history.

(56) References Cited

U.S. PATENT DOCUMENTS

| | | | |
|---|---|---|---|
| 5,610,665 A | 3/1997 | Berman | |
| 6,714,486 B2 * | 3/2004 | Biggs | ............................. 368/82 |
| 7,920,208 B2 * | 4/2011 | Maracic et al. | .............. 348/473 |
| 2003/0192049 A1 * | 10/2003 | Schneider et al. | .............. 725/51 |
| 2007/0162854 A1 | 7/2007 | Kikinis | |
| 2007/0250901 A1 * | 10/2007 | McIntire | ............ H04N 7/17318 |
| | | | 725/146 |
| 2009/0187485 A1 * | 7/2009 | Loui et al. | ....................... 705/14 |
| 2009/0210790 A1 * | 8/2009 | Thomas | ........................ 715/719 |

(Continued)

OTHER PUBLICATIONS

Cloudy With a Chance of Meatballs DVD and Blu-ray Release Date. http://smartcine.com/blog/2009/11/08/cloudy-with-a-chance-of-meatballs-dvd-and-blu-ray-release-date. Nov. 11, 2008.

*Primary Examiner* — Thai Q Tran
*Assistant Examiner* — Syed Y Hasan
(74) *Attorney, Agent, or Firm* — Mayer & Williams, PC

(57) ABSTRACT

Apparatus and methods are provided to implement a technique for an interactive video system that allows a user to place supplemental items such as images on a main image being displayed. In one implementation, a user causes images of flying food to be displayed on top of a playing movie. Supplemental item data may be provided on the same media as is the main item data, e.g., on an optical disc, and control information may be provided on the media to control how supplemental item data is applied and presented.

21 Claims, 5 Drawing Sheets

(56) References Cited

U.S. PATENT DOCUMENTS

2010/0050110 A1* 2/2010 Hughes et al. ............... 715/781
2011/0053688 A1* 3/2011 Crawford ................. A63D 5/04
                                                       463/31

* cited by examiner

ENHANCEMENT OF MAIN ITEMS VIDEO DATA WITH SUPPLEMENTAL AUDIO OR VIDEO

STATEMENT OF RELATED APPLICATIONS

This application claims benefit of U.S. Provisional Patent Application Ser. No. 61/286,506, filed Dec. 15, 2009, entitled "Splat Mode", owned by the assignee of the present invention and incorporated herein by reference in its entirety.

BACKGROUND

Video content has a long history of being enjoyed in a passive setting. For example, DVDs and video CDs have provided tremendous entertainment value in which users have passively enjoyed watching content as a content creator has intended and provided it. Advanced video media, such as Blu-Ray® discs, provide a more interactive setting for user enjoyment. For example, users may employ Blu-Ray® discs to access specific features on the Internet using the BD-Live® system. Users may also play games or access other interactive content. Interactive systems can enhance the user experience and provide new ways for users to enjoy content.

SUMMARY

Apparatus and methods are provided to implement a technique for an interactive video system that allows a user to add a supplemental item of audio or video content ("supplemental item") to a main item of video content ("main item"). In one implementation, a user causes images of flying food to be displayed on top of a playing movie.

In one aspect, the invention is directed towards a system for enhancing a main item of video data with a supplemental item, including a processor having a capability for executing programming to implement playback of items of video data, a means for receiving video data for display, a means for receiving a non-transitory computer-readable medium, a storage means for storing data retrieved from the non-transitory computer-readable medium or data received from a network, or a combination of both types of data. The system also includes memory in communication with the video data receiving means bearing computer-readable instructions capable of causing the video data receiving means to render the main item of video data and to direct a signal corresponding to the rendered video data to an output jack, and memory bearing computer-readable instructions capable of causing a rendering of a supplemental item.

Implementations of the invention may include one or more of the following. The memory bearing computer-readable instructions capable of causing a rendering of a supplemental item may include memory in communication with the video data receiving means bearing computer-readable instructions capable of causing the video data receiving means to render a supplemental item in addition to the main item of video data and direct a signal corresponding to the rendered supplemental item to the output jack. The addition may include a superposition of the supplemental item of video data on top of the main item of video data. The video data receiving means may be selected from a video graphics card, a graphical processing unit, an integrated chipset, and combinations of the same. The system may further include memory in communication with the video data receiving means bearing computer-readable instructions capable of causing the video data receiving means to render a removal of the supplemental item and direct a signal corresponding to the rendering to the output jack. The supplemental item may include an audio effect. The supplemental item of video data may be associated with a type of image, an image location, or both. The system may further include memory in communication with the processor bearing computer-readable instructions capable of causing the processor to render one or more options by the video data receiving means, the options corresponding to suggested supplemental items. The removal rendering may begin following the passage of a predetermined period of time, or upon user indication.

In another aspect, the invention is directed towards a method for enhancing a main item of video data, the method including, during playback of a main item of video data, receiving a signal indicating that a supplemental item is to be added to the main item of video data, and responding to the received signal by adding the supplemental item to the main item of video data.

Implementations of the invention may include one or more of the following. The receiving a signal may include receiving an indication from a user that a supplemental item mode is to be entered. The method may further include displaying a number of options, the options corresponding to different supplemental items. The method may further include receiving a signal corresponding to a chosen option, the chosen option corresponding to a supplemental item to add. The method may further include receiving a user input, the user input indicating a location at which a supplemental item is to be displayed. The method may further include receiving a signal corresponding to a chosen option, the chosen option corresponding to a location at which a supplemental item is to be displayed. The adding may include superposing the supplemental item on top of the main item of video data. In a related aspect, the invention is directed towards a computer-readable medium, including instructions for causing a computing device to perform the above method.

In yet another aspect, the invention is directed towards a computer-readable medium, including instructions for causing a computing device to perform a method for enhancing a main item of video data, the computer-readable medium including an asset file, the asset file including a main item of video data, and a control file, the control file including computer-readable instructions for enabling a user to enhance a viewing experience of the asset file, the enhancing including adding a supplemental item to the main item of video data.

Implementations of the invention may include one or more of the following. The control file may further include computer-readable instructions for enabling a user to enter an enhancement mode of the control file. The adding may include superposing the supplemental item on top of the main item of video data. The computer-readable medium may further include a supplemental asset file corresponding to the supplemental item of video data, the supplemental asset file including graphical data corresponding to the supplemental item. The supplemental asset file may further include audio data corresponding to the supplemental item, animation data corresponding to the supplemental item, or a combination. The adding may occur upon user activation. The control file may further include computer-readable instructions for enabling a user to choose a supplemental item to be added in the adding step. The control file may further include computer-readable instructions for enabling a user to choose a location at which the supplemental item is to be added in the adding step.

In a further aspect, the invention is directed towards a system for enhancing a main item of video data with a supplemental item, including a processor having a capability for executing programming to implement playback of items of video data, a means for receiving video data for display, a means for receiving a non-transitory computer-readable medium, and storage means for storing data retrieved from the non-transitory computer-readable medium or data received from a network, or a combination of both types of data. The system also includes memory in communication with the video data receiving means bearing computer-readable instructions capable of causing the video data receiving means to render the main item of video data and to direct a signal corresponding to the rendered video data to an output jack, and memory in communication with the video data receiving means bearing computer-readable instructions capable of causing the video data receiving means to render a modification of the main item of video data and direct a signal corresponding to the rendered and modified main item of video data to the output jack.

In a further aspect, the invention is directed towards a method for enhancing a main item of video data, including, during playback of a main item of video data, receiving a signal indicating that a modification of the main item of video data is to occur, and responding to the received signal by modifying the main item of video data.

In a further aspect, the invention is directed towards a computer-readable medium, including instructions for causing a computing device to perform a method for enhancing a main item of video data, the computer-readable medium including an asset file, the asset file including a main item of video data, and a control file, the control file including computer-readable instructions for enabling a user to enhance a viewing experience of the asset file, the enhancing including modifying the main item of video data.

Advantages may include one or more of the following. Supplemental item data may be provided on media, e.g., an optical disc, and the same media may include the main item audio and video data. Control information may be provided on the media to control how supplemental image data is applied and presented.

BRIEF DESCRIPTION OF THE DRAWINGS

Like reference numerals indicate like elements in the drawings. Elements are not drawn to scale unless otherwise indicated.

DETAILED DESCRIPTION

In the disclosed systems and methods, main items and supplemental items are used together to provide a user with an interactive experience. Through the interface of the system the user can select supplemental items and add the same to the main item.

Generally, main items include video content or images. Supplemental items often have two phases: an initial and transitory animation, followed by a persistent or stationary image. Supplemental items may also include audio content, such as audio effects, and in some cases supplemental items may be entirely audio content. Supplemental items may also include video files. It is also noted that in some cases a main item may include entirely audio content, e.g., a soundtrack; even in these cases supplemental items may be added, e.g., sound effects at particularly-intense moments. However, for clarity, the discussion below focuses on a main item of video content being enhanced by a supplemental item.

Figure 1:
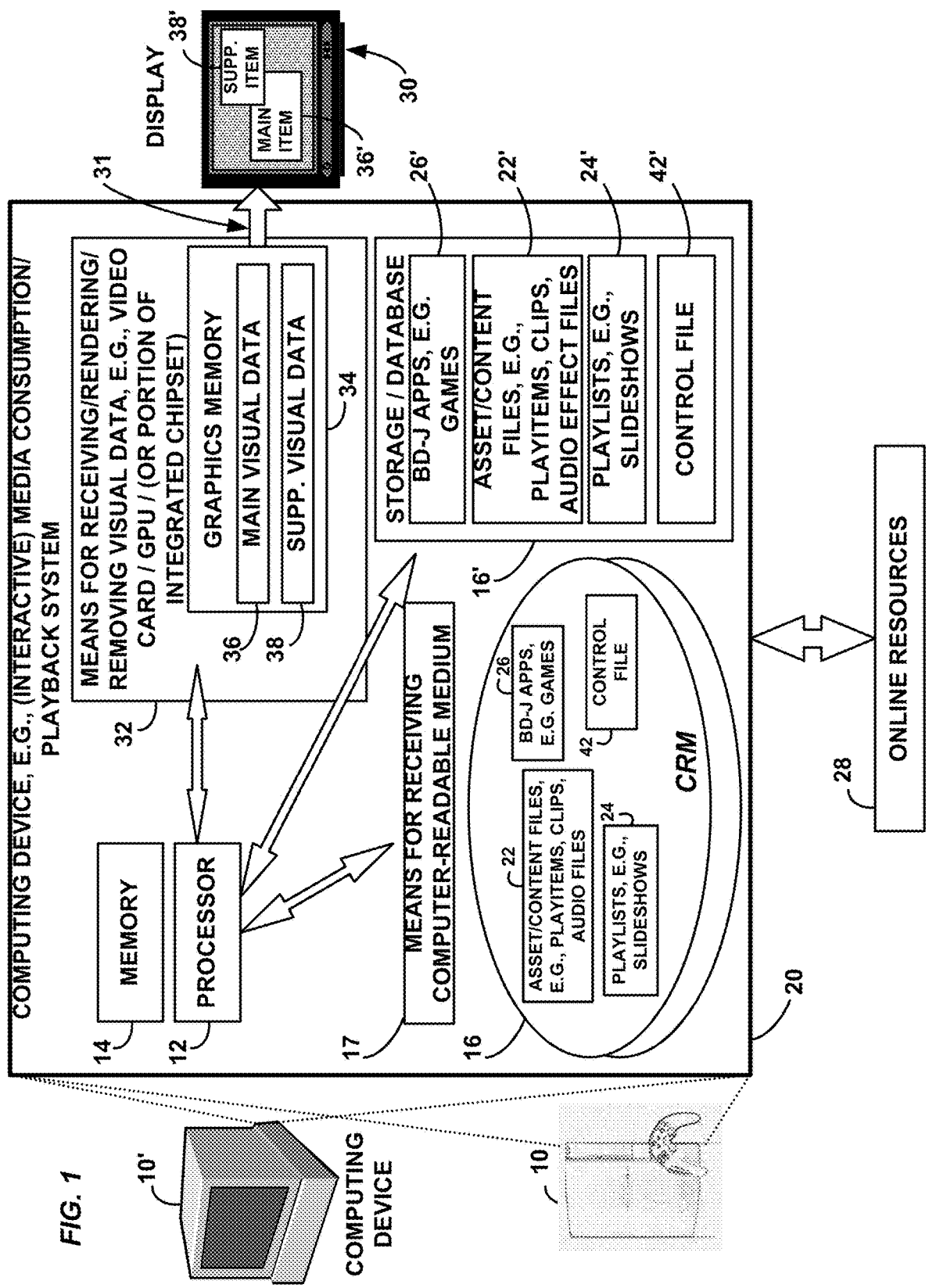
FIG. 1 shows an illustrative gaming system that may be used to implement one or more of the features described herein.

Referring to FIG. 1, a computing device is illustrated which may be a media player 10, a computer 10', or any other sort of computing device. Within the computing device is implemented an interactive media consumption and playback system 20. The computing device includes a processor 12 and memory 14. The computing device also includes a storage or database component 16' along with a means 17 for receiving a computer-readable medium.

The computing device includes a means 32 for receiving video data, and the same is generally used for rendering and removing video data as well. The means 32 may include one or more video cards, one or more graphical processing units (GPU), and/or an integrated chipset with video capabilities. The means 32 may also be integrated into the processor. In whatever form, a graphics memory 34 may be provided, shown within the means but which may also be included elsewhere, e.g., in a CPU memory. In reference to the implementations described here, the same may include an area 36 for main items of video data and an area 38 for supplemental items of audio and/or video data. The output of the means 32 may include a jack 31, which may be any type of video output port, including DVI, HDMI, SVGA, S-video, or the like, as well as wireless such ports. It will be noted that the means 32 may also include combinations of video cards and graphical processing units, as well as combinations including chipsets partially or fully implemented on a processor such as processor 12.

The processor 12 may include any type of processor capable of operating an interactive media consumption and playback system. The memory 14 may be any type of memory, so long as the same is sufficient to allow the processor to operate the interactive system.

The means 17 for receiving a computer-readable medium may be a disk drive, such as a DVD drive or a Blu-Ray® drive. However, the means 17 may also be implemented by a port via which the user may connect an external drive, a flash drive, or any other sort of storage device. In FIG. 1, the means 17 is shown with a non-transitory computer-readable medium 16 disposed therein.

The non-transitory computer-readable medium 16 includes a number of files disposed thereon. These files are described in greater detail in FIG. 2. It is noted that any of the files on the computer-readable medium 16 may also be stored in non-transitory form by the computing device in the storage area 16' by being downloaded from a network, and in particular from an online resource 28. The files include a set of asset files 22, which may constitute the main sources of video and/or audio content.

The asset files 22 include PlayItems, clips, audio files, graphics files, and any other sort of audio or video content. The computer-readable medium 16 may also include interactive applications 26 such as games or the like. In the case of Blu-ray®, these are implemented in Blu-ray® Disk Java, or BD-J. The computer-readable medium 16 may also include playlists 24, which are lists of asset files, to be played in a given order. Finally, the computer-readable medium 16 may include a control file 42, which in part controls how the system and method enhance a main item of video data with a supplemental item of audio and/or video data. The control file 42 may, in some cases, perform or control playback of the main item of video data, however, the same is generally controlled by firmware within the computing device. The control file 42 may work with this firmware to enhance the playback of the main item by supplementing the same with the addition of a supplemental item, as is described below.

The storage or database area 16' may be implemented within a hard drive, flash drive, flash memory, or any other sort of storage device. The same may serve for temporary or long-term storage of files loaded into the system by the computer-readable medium 16. The storage or database area 16' may serve to store, among other files, the same types of files as the computer-readable medium 16. These items may have originated from a computer-readable medium or from an online resource 28. For example, the storage and database area 16' may include applications 26', asset files 22', playlists 24', a control file 42', and any other sort of file needed by the system to provide the enhancement of a main item with a supplemental item.

A visual output of the system and method for enhancing a main item with a supplemental item may be seen in FIG. 1 on display 30. The display 30 is shown connected to the jack 31, which will be understood to encompass not only physical jacks but also wireless connections. A main item 36' is shown in the display 30 with a supplemental item 38' added to it. The way in which the supplemental item 38' may be added to the main item 36' may vary. The adding may include superposing the supplemental item on top of the main item, where the term "on top of" means to display the same on a layer above the layer of the main item. For example, in the Blu-ray® context, the supplemental item may be displayed on the interactive graphics plane, while the main item may be displayed on the primary or secondary video planes.

Figure 2:
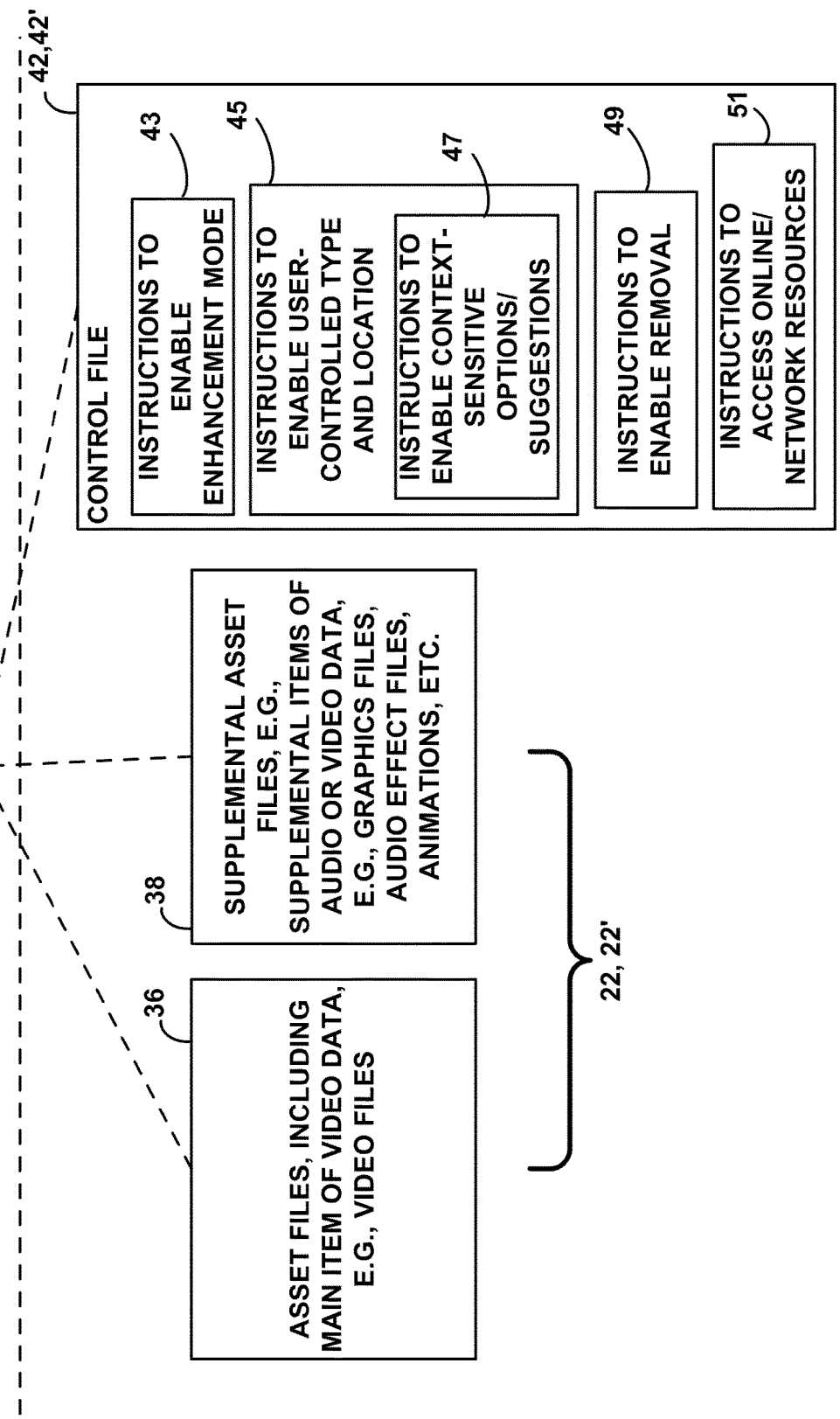
FIG. 2 shows a functional block diagram of a non-transitory computer-readable medium or other memory storage device that may be used to implement one or more of the features described herein.

FIG. 2 illustrates a more detailed depiction of the computer-readable medium. As noted, the computer-readable medium may also constitute a storage area within a computing device, such as a hard drive, flash memory, or any other sort of storage or memory. The computer-readable medium or storage 16/16' may include one or more asset files 36. The asset files may include the main item, such as a video file. The asset files 36 may also include other video files, such as trailers, copyright notices, studio information, or the like, as well as image files for slideshows, etc. A number of supplemental asset files 38 may also be included on the computer-readable medium 16/16'. The supplemental asset files 38 may include the files necessary to control and render the supplemental items. These may include graphics files, video files, audio effect files, animation files, and so on. These files are used, e.g., when an indication signal is received that a supplemental item is to be added to a main item. For example, the files may be used to render and display a supplemental item of video data, along with an audio effect, if desired. In some cases, only an audio effect will be desired; in this case no video display is performed.

The supplemental asset files 38 may also include data about one or more removal effects to be applied. These removal effects, particularly used when the supplemental item includes video data, may simply constitute causing the supplemental item to disappear, to fade away, to dissolve, to appear to evaporate, to slowly slide off the screen as if under the effect of gravity, and so on. Such removal effects may be caused to happen after a predetermined amount of time, upon user indication, or via other triggers. More complicated removal effects, as well as more complicated addition effects, through which the supplemental item may be added to the main item, may be enabled by animations within the supplemental asset files 38. Together, asset files 36 and supplemental asset files 38 make up assets/content files 22/22' of FIG. 1.

The control file 42/42' is also included within the non-transitory computer-readable medium or non-transitory storage 16/16', respectively. The control file 42/42' may include instructions 43 to enable an enhancement mode. These instructions, which are optional, allow the user to enter a mode where supplemental items may be added to a main item. The instructions 43 may further enable the user to toggle into or out of this mode. Outside of the mode, the user is unable to add supplemental items of video data. Without use of such a toggle, the system may be by default in or out of the enhancement mode.

The control file 42/42' may also include instructions 45 that enable users to control the type of supplemental items, as well as where they should appear in the case of video items. In particular, where users are enabled to add food items to the display, in the sense of throwing them at the screen, then a list of food items may be displayed from which the user can choose. The list may be displayed in any number of ways, including a context sensitive pop-up menu, a drop-down list, and so on. Alternatively, a given food item may appear by default and the user may be enabled to cycle through other food items by activation of a button. For example, in the Blu-ray® context, four colored buttons are provided to enable access to special features: red, blue, yellow, and green. By pressing the green button, various foods may be cycled through, each one appearing as the "active" food. When a given food is "active", if a user pushes a "select" button, the food appears to be thrown at the screen. In the same way, a user may be enabled to choose the location at which the supplemental item is to be added, e.g., where the thrown food hits the screen. For example, the arrow keys on a remote control may be used to move a crosshairs or target.

In one implementation, further instructions 47 are provided to enable context-sensitive options or suggestions. In this way, depending on the context of the main item of video data, a different set of supplemental items may appear, this set being appropriate vis-a-viz the context of the main item. For example, as noted above, supplemental items such as food may appear to be thrown at the screen in cases where the main item pertains to food. For example, while watching a cooking show, one may be enable to throw food corresponding to the ingredients currently being employed. One of ordinary skill in the art will envision variations, given this teaching. For example, while watching a boxing movie, the user may be enabled to appear to throw punches at the screen, with cracks appearing in the screen where the punches land, and disappearing over time. These context-sensitive options may thus provide suggestions for the user for the supplemental items.

The control file 42/42' may also include a set of instructions 49 to enable removal of the supplemental item. As noted above, these instructions 49 can be those that themselves cause the removal of the supplemental item, or which point to animation subroutines which may perform the same acts. For example, pressing one of the colored buttons noted above may perform a wiping function, in which the last food item is cleared or in which the entire screen is cleared of thrown food items. Other colored buttons may perform other functions, e.g., allowing toggling into and out of the enhancement mode, or transferring the video image back to a main menu.

The control file 42/42' may further include a set of instructions 51 that allow the computing device to access particular online or network resources. For example, these instructions may include appropriate credentials to allow access to the online resources. The instructions 51 may further include information about particular locations at which such online resources may be accessed.

Figure 3:
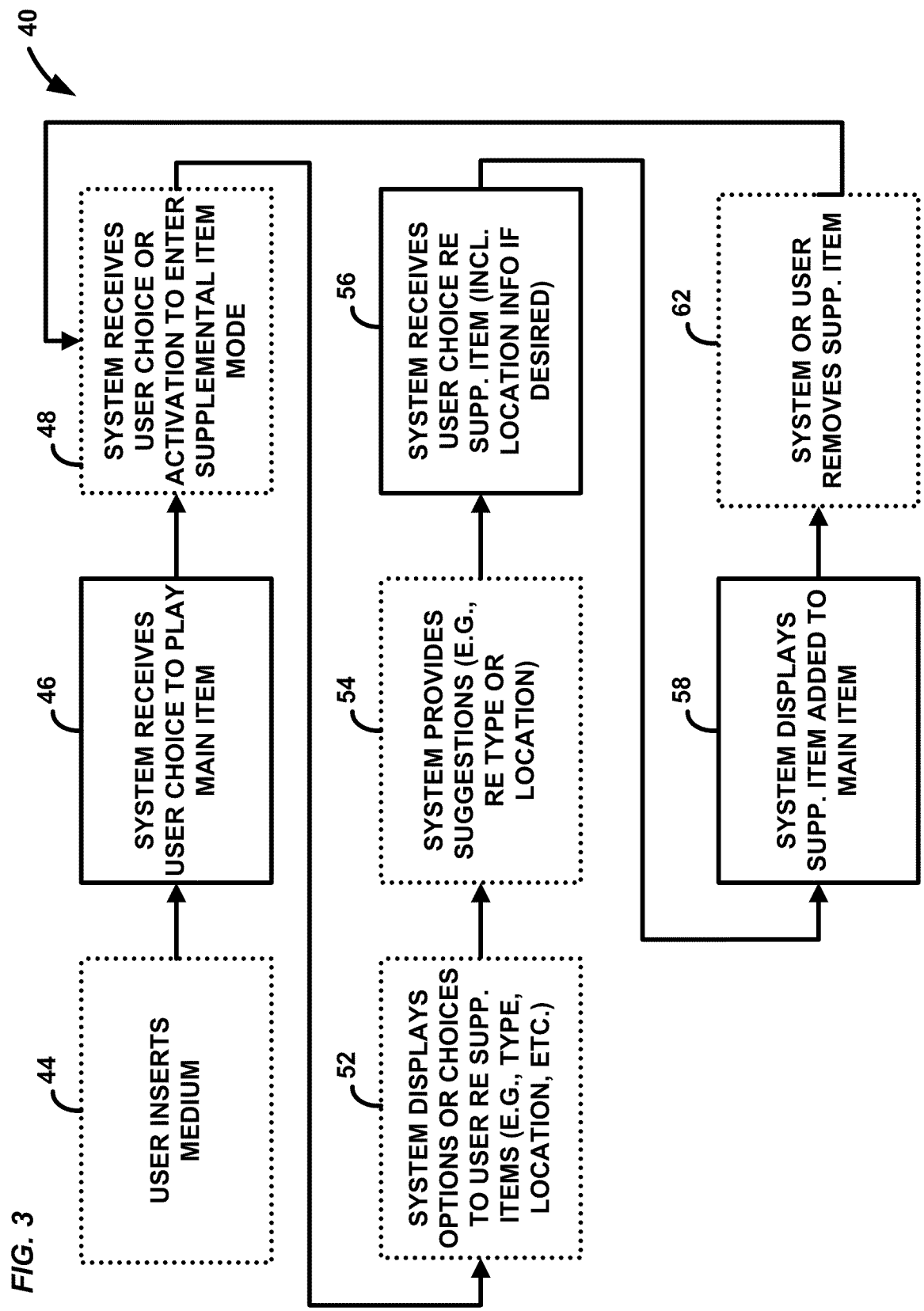
FIG. 3 shows a flowchart of a method according to an embodiment of the invention.

FIG. 3 is a flowchart of a method 40 of one exemplary implementation of the invention. Preliminary steps include that the user inserts the computer-readable medium into the computing device (step 44), such as a media player. One such media player may be the PlayStation 3® game console available from Sony Computer Entertainment America Inc., of Foster City, Calif. It will be understood that other media players may also be employed, such as Blu-ray® players, DVD players, personal computers, or the like. It will also be understood that this step may take place an arbitrary amount of time prior to the beginning of any implemented inventive method. It will also be understood that a consumer or user need not physically insert a non-transitory disk medium. Rather, the method may be initiated and implemented entirely or partially using non-transitory files already stored within the media player, such as may have been downloaded or previously copied into storage.

A next step is that the system receives a user choice to play a main item, such as a main video (step 46). The user choice may entail, for example, the user pushing a "play" button on a remote control or on the media player. The user choice may also be minimal; for example, the user may simply insert the media and the main item may begin playing back.

A next step is that the system receives a user choice or activation to enter a supplemental item mode (step 48). This step is optional; for example, the system may be by default initially in this mode. Alternatively, a user may choose to only enter the mode at appropriate times during playback of the main item, or the user may be only allowed to enter the mode at such times. For example, during some segments, it may be inappropriate or otherwise not desired to cause the display of supplemental items, e.g., the same may prove distracting to a viewer. However, during other times, it may be desired not only to display the supplemental items but also to enable multiple viewers to cause supplemental items at the same time, e.g., in the context of contests. Such instances would require multiple input means.

A next step, which is optional, is for the system to display options or choices to the user regarding possible supplemental items (step 52). For example, the system may display a number of options or choices regarding types of supplemental items. In one implementation, the system displays a number of types of food products which the user may choose to appear to have thrown at the screen. In the same way, a user may choose one or more locations at which the supplemental item should be displayed. Either or both of these choices may be by way of a pop-up menu, a virtual keyboard, a game console controller, cycling through choices, by using arrow keys on a remote control to move a target, by directing a pointing device such as the remote control at a location on the screen, or via any other sort of selection device. In the Blu-ray® context, the above-noted colored remote control buttons may be employed. A related step is that the system may provide suggestions to the user on the screen (step 54) that are not just default suggestions but that are context sensitive, in the same way as described above.

The system next receives a user choice or activation regarding the option or suggestion chosen (step 56). The option or suggestion chosen is often just the type of item and optionally the location; however, in advanced implementations, it may include the type of supplemental item, a chosen graphic, a chosen animation, a chosen sound, as well as any other parameters. For example, in the case where the visual metaphor is food being thrown at the screen, additional parameters may include the amount and type of food and a velocity of throwing.

A next step is that the system adds the supplemental item to the main item. For example, the supplemental item may be displayed on top of the main item (step 58). The term "on top of" may pertain to any display of the supplemental item in combination with the main item. For example, it may mean that the supplemental item is displayed on a layer above the main item, on a layer below the main item, on an intermediate layer, formed as part of the main item, or the like. Animations may be used to enhance this effect. For example, the supplemental item may appear to splatter on the screen with an appropriate sound effect, and then to drip down the screen as if under the effect of gravity.

A next step may be that the system removes the supplemental item of video data (step 62). The removal may be caused by the passage of time, e.g., following the passage of a predetermined period of time, the supplemental item is automatically removed. In another implementation, the supplemental item is removed by way of an animation. For example, as described above, the same may appear to drip off the end of the screen. In other implementations, the supplemental item slowly fades away, dissolves, appears to deteriorate or age, or the like. In some implementations, the user may be enabled to remove particular supplemental items. It will also be understood that the supplemental item may also be persistently displayed until the enhancement mode, or supplemental item mode, terminates.

Figure 4:
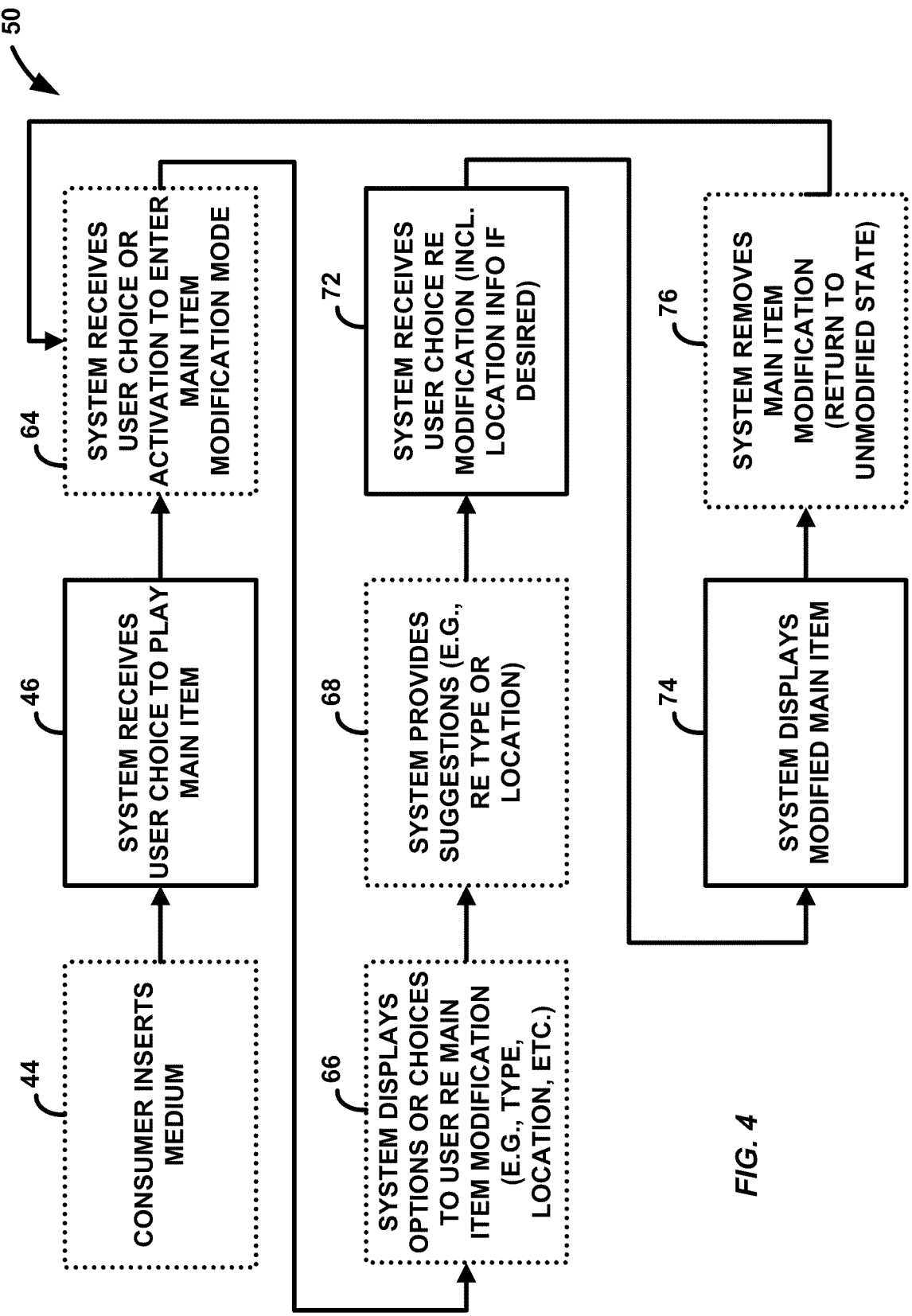
FIG. 4 shows a flowchart of a method according to another embodiment of the invention.

FIG. 4 illustrates a flow chart 50 of a method of another implementation of the system, this implementation pertaining to modifying a portion or the entirety of a main item rather than adding a supplemental item to the same. In many cases, the modification is performed by passing a section of the image through a suitable transformation. However, in some advanced implementations, it is also envisioned that a content developer may make special provisions to accommodate this mode. For example, a content developer may render a majority of a movie but leave one or more characters or items for rendering and display at the time of playback. For example, in the Blu-ray® context, the rendered portion may be displayed on a video plane while the character to be potentially modified is displayed on an interactive graphics plane. In this case, the graphics data about the character is available and thus modification of that data may occur.

Certain steps remain the same as in FIG. 3, and the same comments apply. These include steps corresponding to the medium being inserted (step 44), as well as the step of receiving a signal indicating that a user chooses to play a main item (step 46).

New steps include that the system receives a user choice or activation to enter a main item modification mode (step 64). In a main item modification mode, the main item is not supplemented with a supplemental item; rather the main item is modified in some way as noted above, e.g., via a distortion effect. For example, a "blackhole" effect may be instituted in which a small swirling circle is placed on top of a main item, causing a radial swirling of the graphical elements in that region. A "funhouse mirror" modification may be caused in which graphical elements are elongated or otherwise distributed in a way similar to that of a funhouse mirror. An audio effect may be caused to be played whenever a particular screen location is targeted and/or activated.

The system may display options or choices to the user regarding different ways of modifying the main item (step 66). These options or choices may pertain to the type of modification as well as to a location for the modification to be applied. Other aspects of this step are analogous with those described for step 52 above. In the same way, the system may provide suggestions as to the type or location of modification (step 68), and the same may be context-sensitive or otherwise dictated by the system's analysis of the context of the main item, or other factors. The system then receives a user choice regarding the modification, including location information if applicable (step 72).

Following the user choice or activation, the system may display the modified main item, along with corresponding audio if desired or otherwise called for (step 74). For example, the "black hole" effect described above may be accompanied by a corresponding "whoosh" sound effect. Finally, in some implementations, the system may remove the modification of the main item, returning the main item to the unmodified state (step 76). The removal may be instigated and controlled by the same factors disclosed with respect to step 62 above.

EXAMPLE

In one example of a new interactive system, a Blu-ray® Disc (BD) includes data to display a movie and also includes software to superimpose supplemental items, such as on top of the movie as it is played. When the BD is loaded into a BD player, the player can use the data and software to display the movie and supplemental items. In another example, the BD player downloads some or all of the supplemental items and software from a network resource, e.g., from a server using BD-Live®.

The media player may present an option to the user to activate the supplemental item mode. The user can select the option using the UI and/or a remote control for the player. When the player is in the supplemental item mode, the player presents the user with options of items to select and a location to place the item. For example, the user could select from among multiple types of food and could select a location on the displayed video image using a target or cursor controlled by the remote control. In another implementation, the BD includes targeting information to assist with placing the supplemental items. For example, the BD includes information indicating the location, e.g., an area of screen coordinates, of an item of interest, e.g., a face, and the player may select the nearest area of interest. When the user selects a "place image" command the player causes the selected supplemental item to be placed at the indicated location. In the case of the food example, the "place image" command could be a "throw food" command. The player could superpose a series of images, e.g., video or animation, of the selected food flying from the edge of the displayed image to the target location and then images of the impact and splatter, e.g., apparently impacting on the screen. The superposed image can remain until removed by a user command or could change or disappear over time. For example, the splattered food could appear to gradually slide down or fall off of the movie image. To remove the supplemental images, the user can select a clear or wipe command. The wipe command could also be further interactive allowing a user to appear to wipe off supplemental images, e.g., using a sponge cursor.

In addition, the BD can provide data for supplemental audio as well. The player can use the audio in conjunction with the supplemental images. For example, the media player could play a sound effect of food impacting a surface when the supplemental image of the food reaches the impact point. Similarly, the supplemental audio could include reaction audio, such as simulated audience laughter or applause.

Figure 5:
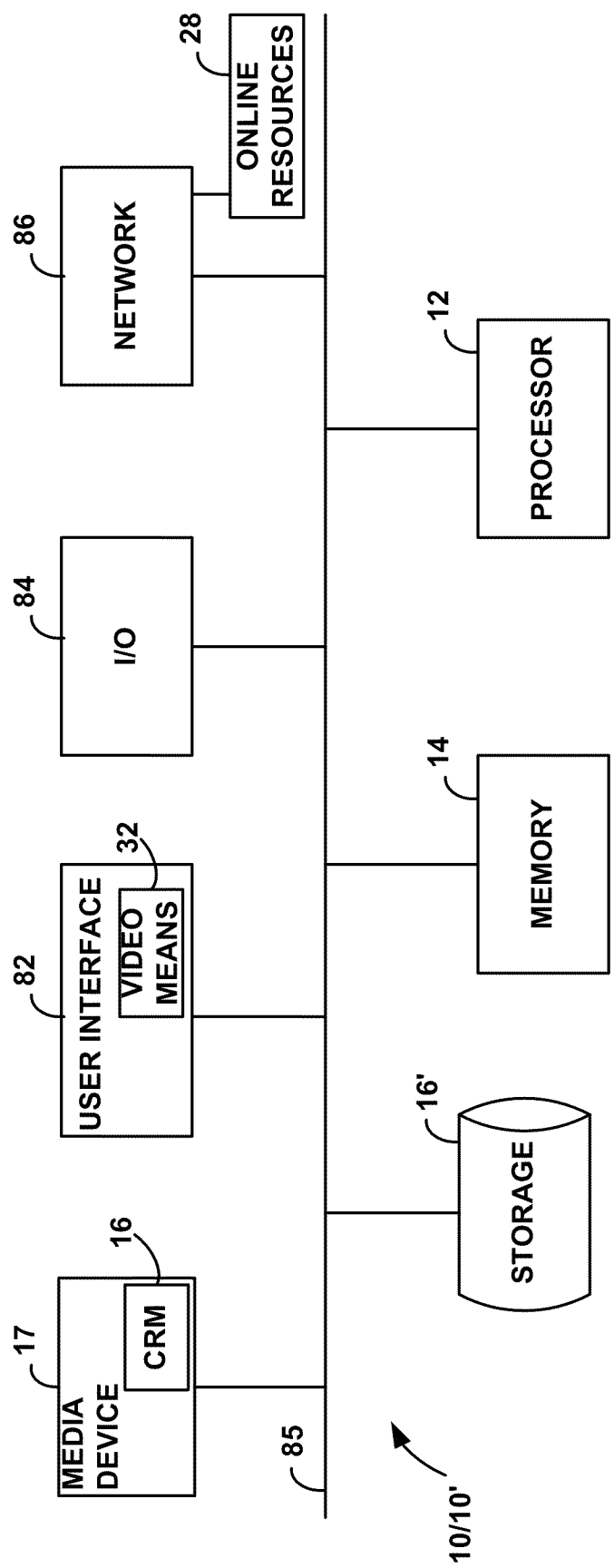
FIG. 5 illustrates an exemplary structure of a computing device that may be employed to implement one or more of the features described herein.

One implementation includes one or more programmable processors and corresponding computer system components to store and execute computer instructions, such as to provide the media player, media access and presentation, and supplemental data and image access and presentation. For example, referring to FIG. 5, a representation of an exemplary computing device, e.g., gaming console or media player 10 or computer 10', is illustrated. The device 10/10' includes the processor 12, the memory 14, the storage area 16', the means for receiving a computer-readable medium such as media device 17, shown with computer-readable medium 16, a user interface 82, an input/output (I/O) interface 84, and a network interface 86 for connection to the online resources 28. These components are interconnected by a common bus 85. Alternatively, different connection configurations can be used, such as a star pattern with the controller at the center.

The processor 12 controls the operation of the device 10/10' and its components. The processor 12 loads instructions from the memory 14 or an embedded controller memory (not shown) and executes these instructions to control the system. In its execution, the processor 12 may provide the system for enhancing a main item with a supplemental item as, in part, a software system. Alternatively, this service can be implemented as separate components in the device 10/10'.

The memory 14 stores data temporarily for use by the other components of the device 10/10', such as for storing the control file during its execution. In one implementation, memory 14 is implemented as RAM. In some implementations, memory 14 also includes long-term or permanent memory, such as flash memory and/or ROM.

The storage area 16' stores data temporarily or long term for use by other components of the device 10/10', such as for storing data used by the system for enhancing a main item. In one implementation, storage 16' is a hard disk drive. In another, storage 16' is a solid state drive or comprises flash memory or the like.

The media device 17 receives removable media and reads and/or writes data to the inserted media. In one implementation, the media device 17 is an optical disc drive or disk burner such as a Blu-ray® drive.

A user interface 82 includes components for accepting user input from the user of the device 10/10' and presenting information to the user. In one implementation, the user interface 82 includes a keyboard, a mouse, audio speakers, and a display. The user interface also includes the means for receiving/rendering/removing video data 32.

The I/O interface 84 includes one or more I/O ports to connect to corresponding I/O devices, such as external storage or supplemental devices, e.g., a printer or a PDA. In one implementation, the ports of the I/O interface 84 include ports such as: USB ports, PCMCIA ports, serial ports, and/or parallel ports. In another implementation, the I/O interface 84 includes an interface for wireless communication with external devices.

The network interface 86 includes a wired and/or wireless network connection, such as an RJ-45, or WiFi interface (802.11), or an Ethernet connection. Numerous other types of network connections will be understood to be possible, including WiMax, 3 G or 4 G, satellite, Bluetooth®, or the like. Any of these may be employed to connect to online resources 28.

The device 10/10' includes additional hardware and software typical of computing devices, e.g., power, cooling, operating system, though these components are not specifically shown in the figure for simplicity. In other implementations, different configurations of the device can be used, e.g., different bus or storage configurations or a multi-processor configuration.

While the arrangement has been described with respect to a computing device that is a game console, it is to be understood that the arrangement may be implemented in any number of computing devices, including laptop computers, desktop computers, tablet computers, handheld computers, mobile phones, smart phones, and the like.

The examples above are illustrative and not limiting, and variations of the interactive system are possible as well. Other types of media or supplemental items could be used. The system is not necessarily limited to BD, but could use other media such as DVD or video, e.g., streaming, or images. For example, images of paint or other liquids being thrown or sprayed could be used. In another example, the supplemental items could be applied progressively, such as by a painting or drawing mechanism. Moreover, while the main item has been generally discussed in the context of a movie, special preselected images or video files may be employed as main items. While a modification of a main item has been disclosed, it is understood that the modification may be to the original graphical data constituting the main item or the original graphical data may have a transformation applied that causes the appearance of the modification. When the modification is to be removed, the transformation is removed as well or an inverse transformation is applied. Accordingly, the technology is not limited to the specific examples discussed above, which are provided only as example forms of implementing the claims.

The invention claimed is:

1. A system for enhancing a main item of video data with a supplemental item, comprising:
   a. a processor having a capability for executing programming to implement playback of items of video data;
   b. means for receiving video data for display;
   d. storage means for storing data retrieved from a non-transitory computer-readable medium or data received from a network, or a combination of both types of data;
   e. memory in communication with the video data receiving means bearing computer-readable instructions capable of causing the video data receiving means to render and playback a main item of video data, the main item of video data including a series of images of video and to direct a signal corresponding to the rendered played back video data to an output jack; and
   f. memory bearing computer-readable instructions capable of causing a rendering of a supplemental item superposed with the main item of video data during the playback of the main item of video data, the supplemental item including a series of images constituting an animation, the rendering of the supplemental item in response to viewer input during playback, the viewer input choosing a location within the main item of video data and a type of supplemental item to be rendered, the type of supplemental item selected from a list or a menu, and wherein the memory bearing computer readable instructions capable of causing a rendering of a supplemental item renders the supplemental item in two phases, a first phase being an initial transitory animation, followed by a second phase being a persistent or stationary image, and further comprising memory in communication with the video data receiving means bearing computer-readable instructions capable of causing the rendering of a removal of the supplemental item and the directing of a signal corresponding to the rendering of the removal to the output jack.

2. The system of claim 1, wherein the memory bearing computer-readable instructions capable of causing a rendering of a supplemental item includes memory in communication with the video data receiving means bearing computer-readable instructions capable of causing the video data receiving means to render a supplemental item in addition to the playback of the main item of video data and direct a signal corresponding to the rendered supplemental item to the output jack.

3. The system of claim 2, wherein the addition includes a superposition of the supplemental item of video data on top of the main item of video data being played back.

4. The system of claim 2, further comprising memory in communication with the video data receiving means bearing computer-readable instructions capable of causing the video data receiving means to render a removal of the supplemental item and direct a signal corresponding to the rendering to the output jack.

5. The system of claim 4, wherein the removal rendering begins following the passage of a predetermined period of time.

6. The system of claim 4, wherein the removal rendering begins upon user indication.

7. The system of claim 1, wherein the video data receiving means is selected from the group consisting of: a video graphics card, a graphical processing unit, an integrated chipset, and combinations thereof.

8. The system of claim 1, wherein the supplemental item includes an audio effect.

9. The system of claim 1, further comprising memory in communication with the processor bearing computer-readable instructions capable of causing the processor to render one or more options by the video data receiving means, the options corresponding to suggested supplemental items.

10. A method for enhancing a main item of video data during playback of the main item by a media player, comprising: a. during playback of a main item of video data in a media player, the main item of video data including a series of images of video, receiving a signal from a source of viewer input indicating that a supplemental item is to be superposed with the main item of video data, the supplemental item including a series of images constituting an animation; and b. responding to the received signal by superposing the supplemental item with the main item of video data, the viewer input received during playback indicating a choice of location within the main item of video data and a type of supplemental item to be rendered, the type of supplemental item selected from a list or a menu, wherein the receiving a signal further includes receiving an indication from a viewer that a supplemental item mode is to be entered, and wherein the superposing the supplemental item with the main item of video content includes causing a rendering of a supplemental item in two phases, a first phase being an initial transitory animation, followed by a second phase being a persistent or stationary image, and further comprising causing the rendering of a removal of the supplemental item.

11. The method of claim 10, further comprising displaying a number of options, the options corresponding to different supplemental items.

12. The method of claim 11, further comprising receiving a signal corresponding to a chosen option, the chosen option corresponding to a supplemental item to superpose.

13. The method of claim 11, further comprising receiving a signal corresponding to a chosen option, the chosen option corresponding to a location at which a supplemental item is to be displayed.

14. The method of claim 10, wherein the superposing includes superposing the supplemental item on top of the main item of video data.

15. A non-transitory computer-readable medium, comprising instructions for causing a computing device to perform the method of claim 10.

16. A single non-transitory computer-readable medium, storing instructions for causing a computing device to perform a method for enhancing a main item of video content during playback in a media player, the computer-readable medium comprising: a. an asset file configured for playback in a media player, the asset file including a main item of video content, the main item of video content including a series of images of video; and b. a control file, the control file including computer-readable instructions for enabling a viewer to enhance a viewing experience of the asset file during playback of the asset file in the media player, the enhancing including superposing a supplemental item with the main item of content during playback of the asset file in the media player in response to a viewer input occurring during playback and causing the superposing, the supplemental item including a series of images constituting an animation and stored on the non-transitory computer-readable medium or downloadable from a network source upon a command from the control file, the control file further including computer-readable instructions for enabling a user to choose a type of supplemental item, the type of supplemental item selected from a list or a menu, and a location within the main item of video content at which the supplemental item is to be superposed, and wherein the superposing the supplemental item with the main item of video content includes causing a rendering of a supplemental item in two phases, a first phase being an initial transitory animation, followed by a second phase being a persistent or stationary image, and further comprising causing the rendering of a removal of the supplemental item.

17. The computer-readable medium of claim 16, wherein the control file further includes computer-readable instructions for enabling a user to enter an enhancement mode of the control file.

18. The computer-readable medium of claim 16, wherein the adding includes superposing the supplemental item on top of the main item of content.

19. The computer-readable medium of claim 16, further comprising a supplemental asset file corresponding to the supplemental item of content, the supplemental asset file including graphical data corresponding to the supplemental item.

20. The computer-readable medium of claim 19, wherein the supplemental asset file further comprises audio data corresponding to the supplemental item.

21. The computer-readable medium of claim 19, wherein the supplemental asset file includes animation data corresponding to the supplemental item.

* * * * *